INVENTOR.
MORRIS FLUGSTAD

INVENTOR.
MORRIS FLUGSTAD
BY
ATTORNEYS

INVENTOR.
MORRIS FLUGSTAD
BY
Reynolds, Beach & Christensen
ATTORNEYS

United States Patent Office 2,829,278
Patented Apr. 1, 1958

2,829,278

ALTERNATOR DRIVE FAULT DETECTION APPARATUS FOR MULTIPLE ALTERNATOR SYSTEMS

Morris Flugstad, Seattle, Wash., assignor to Boeing Airplane Company, Seattle, Wash., a corporation of Delaware Application December 24, 1956, Serial No. 630,377

7 Claims. (Cl. 307—57)

This invention relates to alternating current supply systems in which a plurality of alternators are paralleled and operated isochronously. A broad object hereof is the provision of electrical apparatus for protecting such a system against overfrequency or underfrequency conditions with attendant unbalance of real power delivery among the alternators. The invention is herein illustratively described by reference to its presently preferred form as applied to the protection of a system having three similar alternators; however, it will be recognized that the novel apparatus is not limited to this specific application nor to the details of the illustrative embodiments.

A more specific object of the invention is the provision of electrical detection apparatus associated with the respective alternators and operable to produce an indication or selective control operation, such as disconnecting a particular alternator and its load from the rest of the system, in response to real power overloading or underloading of that alternator relative to the other alternators. A principal object is to achieve this result when this is the only abnormal operating condition as well as when it is attended by a related deviation of system frequency from its normal value, such as during faulty operation of a prime mover governor. A related object is the provision of such detection apparatus which will distinguish between a system overfrequency condition and system underfrequency condition so as to permit initiation of different selective control actions if need be, respectively related to one condition or the other.

A related object is to provide electrical detection apparatus associated with the respective alternators and operable to produce an indication or selective control operation in response to an overfrequency or underfrequency condition inherent in the operation of a particular alternator unit, and to do so independently of the presence or absence of other system abnormalities such as unbalanced loading of the alternators. In this instance one appropriate selective control operation is the disconnection of the particular alternator and its load from the remainder of the system. Another such control operation is removal of drive energy from the prime mover of an offending alternator unit and actuation of its load circuit breaker if the frequency abnormality thereof persists after the alternator and its load have been disconnected from the system. Thus the system will be split up for independent operation of its units if its load division control apparatus, normally essential to its frequency-regulated, balanced-loading, isochronous operation, becomes faulty. On the other hand if the system frequency abnormality results from faulty operation of one particular alternator unit, it alone will be separated from the remainder of the system, and the latter will not be otherwise split.

By providing electrical apparatus for automatically isolating an alternator unit causing unbalanced real load division in the system the need for a mechanical over-running clutch commonly used between alternator and prime mover in aircraft electric power systems is eliminated. This is a distinct improvement because at the high operating speeds of aircraft generator prime movers a satisfactory mechanical clutch of this type is difficult to build and maintain.

Reference is made to the copending application Serial No. 287,482 of Russell W. Stineman and John W. Ward, filed May 13, 1952, now Patent No. 2,636,132, and entitled Alternator Real Power Equalizing Apparatus for Multiple Alternator Systems. In that application there is disclosed apparatus by which real power distribution is substantially equalized among paralleled alternators so as to permit their isochronous operation at precisely regulated system frequency. Such apparatus utilizes means responsive to differential real currents among the alternators in order to impose a correction on the individual speed control of any alternator which assumes more or less than its designed share of real load. The present invention is intended to operate in conjunction with and to be compatible with a control of that general type, that is to operate in a frequency-regulated isochronous system having normally balanced alternator loadings. While the present invention also employs a differential real power loop circuit, it does so for the distinctive purpose of developing a reference bias signal, not for purposes of power equalization but for comparison with a system frequency error signal, in order to detect the existence and nature of the abnormality and to determine which of the alternator units is causing it.

In its preferred form as herein disclosed the novel apparatus comprises, in association with each of paralleled alternators, frequency discriminator means producing a frequency abnormality signal related in polarity and magnitude respectively to the sense and magnitude of any departure of system frequency from the normal value, differential real power detecting means producing a signal, added to the first mentioned signal, and of a polarity and magnitude respectively related to the sense and magnitude of any difference between real power being delivered by the associated alternator and the average value of real power delivered by all the alternators, and means responsive to the algebraic sum of the two signals for performing the required indicating or selective control operation. By proper design of these detecting means the two signals cancel each other out in the circuits of normal alternator units, but add together to produce a resultant output signal in the case of a faulty unit, thereby providing the required selectivity for protecting against such faults as a defective governor. However, as indicated above, with such apparatus it will be seen that either a frequency abnormality alone or a real load division unbalance alone can also produce a net response in said detecting means, so as to split the system into its separate units. In one illustrated embodiment, the control operation consists of the protective operation of the bus tie circuit breaker of the offending alternator to disconnect the latter and its individual load from the remainder of the system. In a second illustrated embodiment, additional means are provided operable after such splitting of the system for disconnecting the alternator from its own load and shutting off its prime mover if a frequency abnormality in that alternator persists after its isolation from the remainder of the system.

These and other features, objects and advantages of the invention will become more fully evident from the following description thereof by reference to the accompanying drawings.

Figure 1:
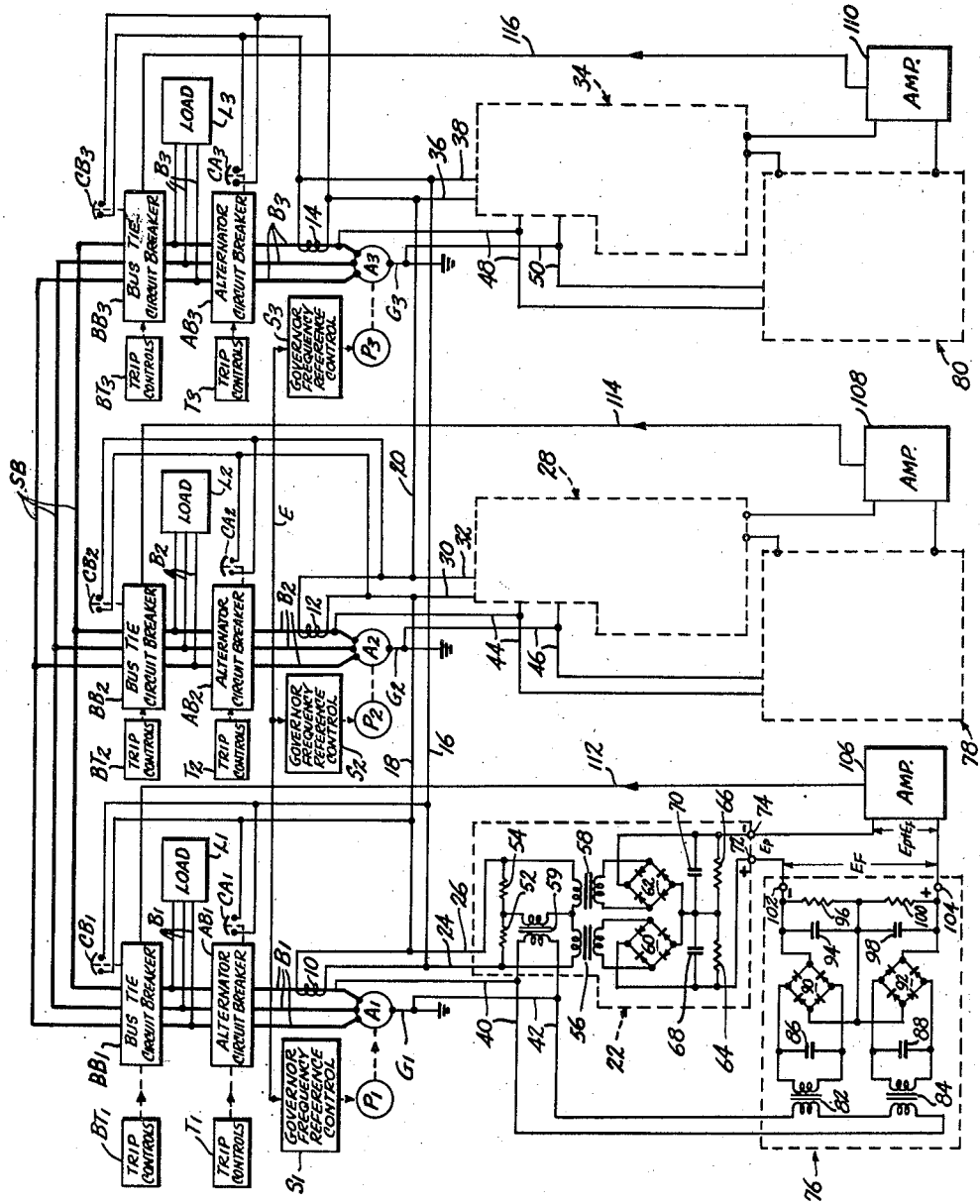
Figure 1 is a simplified schematic diagram of an isochronous load-balanced, frequency-regulated multiple alternator system employing the invention, the view omitting for simplification certain components normally standard in such systems, including certain protective apparatus, voltage regulation apparatus, reactive power equalization apparatus, etc.

Referring to Figure 1, the three alternators A1, A2 and A3 are assumed to have equal ratings. The illustration of three alternators in the system was selected for purposes of generalization herein but it will be recognized that the invention applies broadly to systems with two or more alternators. The invention also applies to systems in which the alternators have unequal real load capacity ratings simply by compensating in any suitable or well known manner for normal differences in differential real current detected by the novel apparatus.

The alternators are driven by separate prime movers P1, P2 and P3, including frequency regulating governor apparatus subjected to reference frequency adjustment by control apparatus S1, S2 and S3, respectively, in order to regulate system frequency. The latter apparatus operates to maintain real power equalization among the alternators by coordination effected through a loop circuit as in the above-cited co-pending Stineman and Ward patent application. The connection E will therefore be understood to comprise a loop circuit for detecting unbalance of real power division among the alternators in order to provide corrective action through the prime mover governors as in said co-pending patent application.

The alternators are illustrated as three-phase machines with ground connections G1, G2 and G3, respectively, and output terminals connected to the respective loads L1, L2 and L3 through three-phase buses B1, B2 and B3. Individual alternator circuit breakers AB1, AB2 and AB3 are interposed in these buses to permit disconnecting the respective alternators from their loads when necessary. These alternator circuit breakers may be tripped by controls T1, T2 or T3, respectively. With light system loading one or more of these breakers may be tripped so that full power is carried through the synchronizing bus by the alternators then in operation. Various fault condition detectors such as overvoltage, undervoltage or overcurrent means may be included in these controls. A synchronizing or tie bus SB is provided for interconnecting the loads of the alternators and thereby synchronizing the system. Individual bus tie circuit breakers BB1, BB2 and BB3, respectively, are interposed in the connections between the synchronizing bus and the individual alternators and their loads to permit disconnecting each alternator and its load from the remainder of the system when required. Suitable or conventional trip controls BT1, BT2 and BT3 may also be provided for these bus tie breakers. The circuit breakers used in the system may be of any suitable or conventional design and may be adapted for actuation in any suitable or conventional manner, the specific nature of which, therefore, is not illustrated in the drawing.

In accordance with the illustrated embodiment of the invention current transformers 10, 12 and 14 are respectively linked with one phase conductor of the alternators A1, A2 and A3 and are connected in series in a loop circuit by conductors 16, 18 and 20. A differential real power sensor 22 associated with alternator A1 has input conductors 24 and 26 connected to respectively opposite ends of current transformer 10. Similarly, the differential real power sensor 28 associated with alternator A2 has input conductors 30 and 32 connected to respectively opposite ends of current transformer 12, while differential real power sensor 34 has input conductors 36 and 38 connected to respectively opposite ends of current transformer 14. The voltage of the phase conductor linked by the current transformer in each instance is also applied as input voltage to the associated differential real power sensor. In the case of alternator A1 this voltage is applied to sensor 22 through input conductors 40 and 42, whereas input conductors 44 and 46 apply the corresponding voltage of A2 to sensor 28 and conductors 48 and 50 do likewise with respect to A3 and sensor 34. The respective phase conductors with which the current transformers are inductively linked are the same phase conductors in all the alternators.

The differential real power sensors 22, 28 and 34 for the different alternators are similar, and for that reason only sensor 22 has been illustrated in detail. In the latter, a voltage divider consisting of equal resistances 52 and 54 in series is connected across the input conductors 24 and 26. The primaries of similar transformers 56 and 58 are also connected in series between these conductors. The primary of transformer 59 is connected between input conductors 40 and 42 and the secondary of this transformer is connected between the respective junctions of the resistances 52 and 54 and of the primaries of transformers 56 and 58. The secondaries of transformers 56 and 58 are connected across corresponding opposite corners of the similar full-wave rectifier bridges 60 and 62, respectively. The intermediate opposite corners of bridges 60 and 62 are series-connected in bucking relationship across the voltage divider consisting of equal resistances 64 and 66 shunted by equal filter condensers 68 and 70, respectively. The net voltage appearing across the serially connected resistances 64 and 66 is applied to the output terminals 72 and 74 of differential real power sensor 22. This voltage is designated $E_P$. In the illustrated form of the circuit the polarity of this voltage is as indicated in the figure if the real power being delivered by alternator A1 exceeds the average real power being delivered by all the alternators. The opposite polarity would occur if the reverse real power unbalance occurred with respect to this alternator. The voltage $E_P$ is normally zero, that is, is zero when the system real power is divided equally among the alternators, but becomes approximately proportional to any real power delivery excess or deficiency of alternator A1.

That differential real power sensor 22 functions to the end described above may be observed from the fact that the current transformers 10, 12 and 14 are connected in a series loop so that any component of current flowing through voltage divider 52, 54 in phase or 180 degrees out of phase with voltage across conductors 40, 42 will be proportional respectively to the amount by which real power delivery of alternator A1 exceeds or is less than the average real power delivery of all the alternators. If the alternator loads are balanced the only voltage applied to the primaries of transformers 56 and 58, respectively, will be that applied by the secondary of voltage transformer 59. Under this condition no voltage appears between output terminals 72 and 74 due to the bucking relationship of the rectifiers 60 and 62. However, if A1 assumes more or less than its proper share of real load, a component of voltage will appear across voltage divider 52, 54, half of which will add vectorially to the secondary voltage of transformer 59 and the other half of which will subtract vectorially from this secondary voltage. Consequently a direct voltage of one polarity or the other will appear across output terminals 72, 74 depending on whether alternator A1 is relatively overloaded or underloaded.

The above explanation assumes that the alternators operate into substantially balanced three-phase loads although if they are not balanced the control apparatus represented by the present invention will not be totally inoperative but will be less sensitive or less effective for its intended purpose. Of course, in the case of a single phase system this is not a factor.

The alternators A1, A2 and A3 also have associated with them respective frequency discriminators 76, 78 and 80 energized by voltage from one of the phases of each alternator. In the example, discriminator 76 is energized by the voltage between conductors 40 and 42, discriminator 78 by the voltage between conductors 44 and 46, and discriminator 80 by the voltage between conductors 48 and 50. The frequency discriminators are of similar form and therefore only the details of discriminator 76 are illustrated. Frequency discriminator 76 preferably is of conventional form. It comprises two similar transformers 82 and 84 whose primaries are connected in series across conductors 40 and 42. The secondary of transformer 82 is tuned by shunt condenser 86 to a frequency displaced in one sense from the normal system operating frequency, while the secondary of transformer 84 is tuned by shunt condenser 88 to a frequency displaced in the opposite sense, but by an equal amount from said operating frequency. A full wave bridge rectifier 90 is connected by opposite corners across condenser 86 and a similar rectifier 92 across condenser 88. The intermediate corners of rectifier bridge 90 are shunted by a parallel filter condenser 94 and resistance 96, and the intermediate corners of bridge 92 by a similar condenser 98 and resistance 100. The resistances are series-connected and their outer ends are connected respectively to discriminator output terminals 102 and 104.

The discriminator operates in the usual manner to produce an output voltage $E_F$ which is proportional to frequency departure from the normal value and of a polarity related to the sense of departure. Such voltage is added algebraicaly to the voltage $E_P$ of the associated differential real power sensor 22 for application to the input of the associated amplifier 106. Similar amplifiers 108 and 110 receive the outputs from discriminators 78 and 80, respectively. As will be described, a certain polarity relationship between the output voltage of the frequency discriminator and associated real power sensor must be observed. In the example the polarity of $E_F$ should be as illustrated when system frequency exceeds the normal value. Any output signals from amplifiers 106, 108 and 110 are applied through the respective connections 112, 114 and 116 to the bus tie circuit breakers BB1, BB2, and BB3 for actuation thereof. Under normal operating conditions both voltages $E_P$ and $E_F$ will be zero, so that the associated bus tie circuit breaker will remain unactuated. However, if either the voltage $E_P$ or the voltage $E_F$ becomes appreciable while the other remains at zero, or if the two voltages become appreciable and add together to produce a resultant other than zero, which they do only in the case of an alternator unit which causes unbalanced load division and attendant frequency deviation, the related bus tie circuit breaker will be actuated to split the system as to the offending alternator. In the case of normally operating alternators the sum of $E_F$ and $E_P$ is zero.

In order to assure mutual cancellation of $E_F$ and $E_P$ in the detectors associated with nonfaulty alternator units during malfunctioning of the prime mover governor of another unit or during some other malfunctioning of the latter causing abnormal system frequency and unbalanced loading among the alternators certain design relationships must be observed. These may be expressed as follows for the ideal cause.

$$E_F = K(\pm \Delta f)$$
$$E_P = KS' \Delta P$$
$$\Delta P = P - P_{av}$$
$$(E_P + E_F) = K(\pm \Delta f) + KS' \Delta P$$

where $(E_P + E_F)$ = direct voltage into amplifier 106 (positive values indicate overfrequency and overloading of A1)
$P$ = real power delivery by A1
$P_{av}$ = average real power delivery by paralleled alternators A1, A2 and A3
$\Delta f$ = frequency deviation from normal value
$K$ = volts/$|\Delta f|$ i. e. sensitivity of frequency discriminator 76, where $|\Delta f|$ is magnitude of frequency deviation $\Delta f$
$S' = |\Delta f|/|\Delta P|$ i. e. sensitivity of real load division control means "S" (Figure 1), that is the amount of change in prime mover governor reference frequency setting which it makes in response to a given $|\Delta P|$, where $|\Delta P|$ is magnitude of power division unbalance $\Delta P$.

Thus it will be seen that operation of the detecting means of the present system should be compatible with that of the load division control means S of the system and that the differential real power sensing means of any alternator should have a gain factor related to that of the associated frequency discriminator.

Whenever any of the bus tie breakers BB1, BB2 or BB3 are tripped to disconnect the associated alternator and its load from the remainder of the system the corresponding contactor CB1, CB2 or CB3 is also closed and shorts across the associated current transformer 10, 12 or 14. Thus the latter is removed from the current transformer loop and does not interfere with its operation as a part of the remaining system. Similar contactors CA1, CA2 and CA3 in the alternator circuit breakers AB1, AB2 and AB3 perform a similar function when the latter circuit breakers are tripped.

In the system of Figure 1 the amplifiers 106, 108 and 110 are of any suitable or conventional type responsive to input signals of either polarity and predetermined magnitude for tripping the associated bus tie circuit breakers through the respective connectors 112, 114 and 116.

Figure 2:
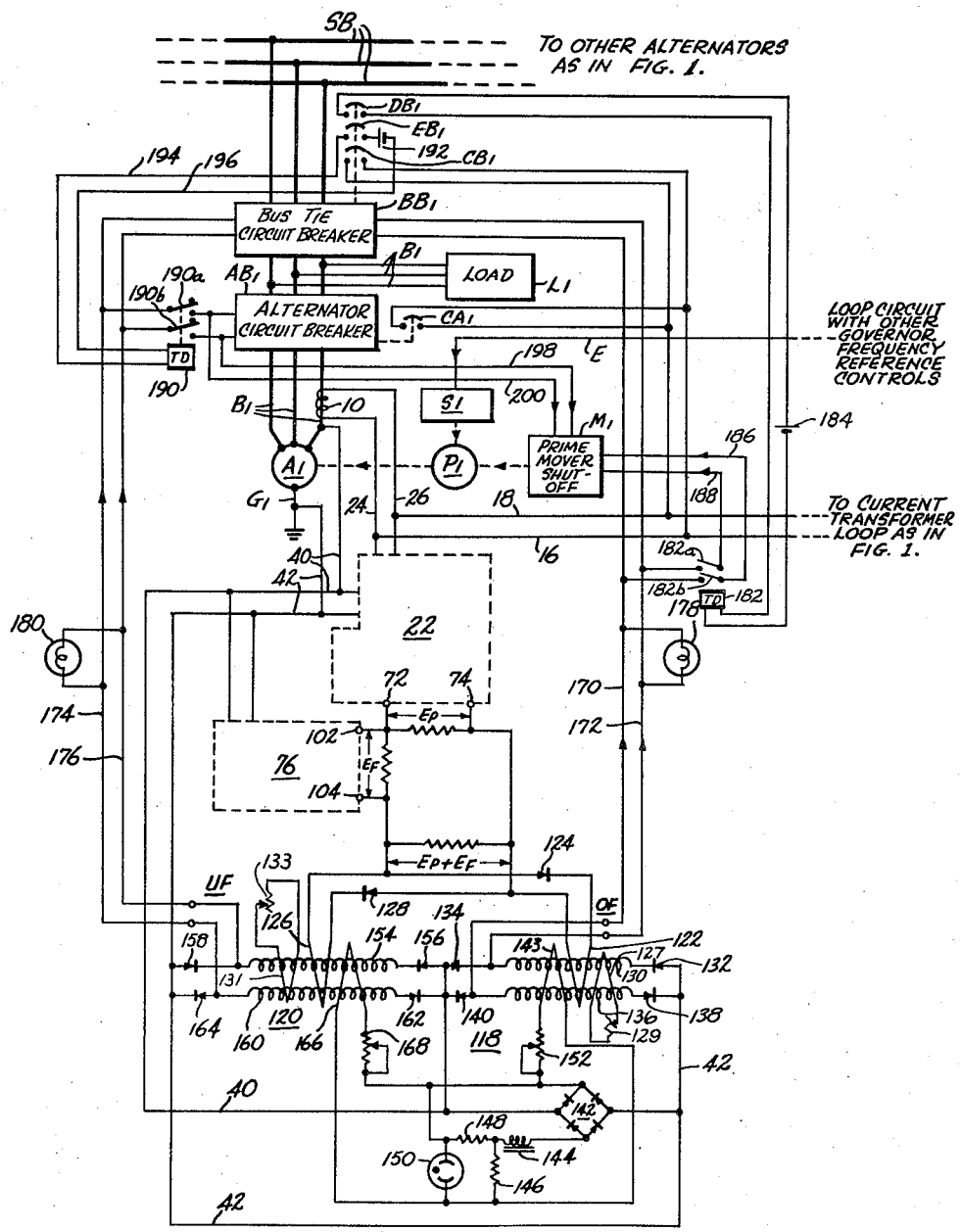
Figure 2 is a simplified schematic diagram of a second embodiment, this view showing only one alternator unit of a system and omitting for simplicity certain conventional apparatus normally required for a complete practical system, but not required in the view for an understanding of this invention.

In the modification of Figure 2, wherein certain reference numerals designate components and devices similar to those designated by like reference numerals in Figure 1, the conditions of overfrequency and attendant excessive real power loading of an alternator and of underfrequency and attendant deficient real power loading of the alternator are detected separately. Alternators A2 and A3 are not shown in the figure but it will be obvious from the drawing that are connected in the system just as in Figure 1 and that each will have sensing and protective apparatus similar to that illustrated in association with alternator A1 and connected therewith in the manner and to the ends illustrated and described.

In Figure 2 the control winding 122 of magnetic amplifier 118 is connected through rectifier 124 to the respective output terminals 74 and 104 so as to be energized by a resultant voltage representing the algebraic sum of $E_P$ and $E_F$. The polarity of rectifier 124 is such that control winding 122 is so energized only in response to the polarity of the resultant of $E_P$ plus $E_F$ which corresponds to the overfrequency, overload condition of alternator A1. Similarly the control winding 126 of magnetic amplfiier 120 is energized through rectifier 128 from the same output terminals, with the relative polarity of rectifier 128 being opposite that of rectifier 124. Thus control winding 126 is energized only when the sum $E_P$ plus $E_F$ has a polarity corresponding to the underfrequency, underload condition of alternator A1.

Figure 4:
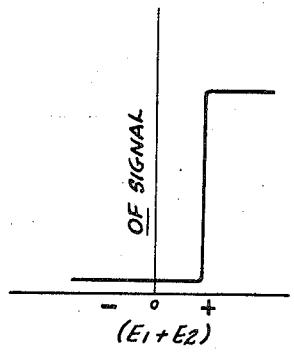

Magnetic amplifiers 118 and 120 are of conventional form. Amplifier 118 includes a reactance or primary winding 130 connected in series with oppositely poled rectifiers 132 and 134 across energizing conductors 40 and 42. A similar primary winding 136 is likewise connected in series with oppositely poled rectifiers 138 and 140 across the same conductors. The output terminals OF of this rectifier are connected to corresponding ends of the two primary windings as shown. A bias winding 143 is energized from conductors 40 and 42 through the full-wave rectifier bridge 142 feeding into a network consisting of series inductance 144, shunt resistance 146, series resistance 148 and shunt voltage regulator tube 150 which network both filters and stabilizes the rectified voltage applied to the bias winding. A variable resistance 152 connected in series with the bias winding may be adjusted to establish the bias current flowing through the winding so as to place the transfer characteristic of the magnetic amplifier at the desired control point as shown in Figure 4. Thus, the bias on amplifier 118 is set so that the output signal at terminals OF jumps suddenly from a relatively low value to a relatively high value when the sum $E_P$ plus $E_F$, during increase thereof in the positive sense shown, reaches a predetermined positive threshold value. A delay winding 127 shunted by variable resistance 129 prevents any normal system frequency transient currents in winding 126 from producing a signal at terminals OF.

Figure 3:
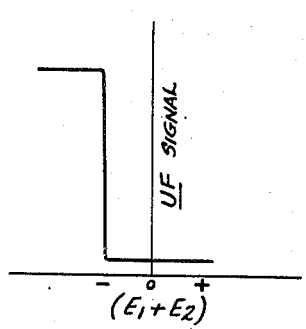
Figures 3 and 4 are magnetic amplifier transfer characteristic diagrams applicable to Figure 2.

Amplifier 120 is similar to amplifier 118, including primary winding 154 and rectifiers 156 and 158, primary winding 160 and rectifiers 162 and 164, bias winding 166, and variable resistance 168 connected in series with this bias winding across the VR tube 150. The resulting transfer characteristic of magnetic amplifier 120, as shown in Figure 3, may be set at the desired control point by the adjustment of resistance 168 so that the output signal at terminals UF jumps suddenly from a relatively low value to a relatively high value at a predetermined negative threshold value of the algebraic sum $E_P$ plus $E_F$. Amplifier 120 also includes delay winding 131 and variable shunting resistance 133.

Lead conductors 170 and 172 extend from output terminals OF to the bus tie circuit breaker BB1 for tripping the circuit breaker and thereby disconnecting the alternator and its load L1 from the remainder of the system in response to the increase of output signal at terminals OF to a material value. Conductors 174 and 176 similarly connect output terminals UF to the bus tie circuit breaker BB1 for tripping the same in response to the increase of output signal at terminals UF to a material value. Such increase of output signal at terminals OF is indicated by illumination of lamp 178 whereas that which occurs at terminals UF is indicated by illumination of lamp 180.

A time delay relay 182 is connected in series with a direct voltage source 184 across normally open bus tie breaker contactor DB1. Closure of such contactor automatically when the bus tie circuit breaker is tripped actuates relay 182 after the time delay inherent in the relay. The delay period is selected to allow sufficient time for the alternator unit A1 to restabilize itself in frequency after it is isolated by operation of BB1. If it still operates at abnormal frequency thereafter, the persisting signal at OF will actuate a prime mover shutoff device M1 through the now closed contacts 182a and 182b of relay 182. As a result, the prime mover shutoff device removes drive power from the prime mover P1. This shutoff device may be of any suitable type depending upon the type of prime mover and the manner of driving the same. Such shutoff device may either remove all drive power from the prime mover or may reduce the drive power to a predetermined minimum value, depending upon the nature of the apparatus.

If an output signal occurs at terminals UF the resultant tripping of bus tie circuit breaker BB1 causes closure of normally open contactor EB1 therein to form an energizing circuit for time delay relay 190. This energizing circuit includes the voltage source 192, the contactor EB1 and the connecting leads 194 and 196. The time delay period inherent in time delay relay 190 is such that if the tripping of the bus tie circuit breaker is effective to remove the cause of the underfrequency condition, represented by the signal at terminals UF, a sufficient period of time will be allowed in which the alternator A1 will become stabilized at the normal operating frequency. Consequently, actuation of this relay at the end of such period by continued closure of contactor EB1, connecting the actuating coil of alternator circuit breaker AB1 to conductors 174 and 176 through the relay contacts 190a and 190b, does not result in tripping of the alternator circuit breaker. However, if the underfrequency condition persists beyond the period of actuation of time delay relay 190, then the alternator circuit breaker will be tripped by the underfrequency signal at terminals UF. Moreover, closure of relay contacts 190a and 190b under the latter condition will form a connection, through conductors 198 and 200 to the prime mover shutoff M1, which connection will actuate the latter.

Thus it will be seen that if actuation or tripping of the bus tie circuit breaker BB1 does not relieve the overfrequency or the underfrequency condition causing that result, the prime mover shutoff M1 will be actuated, allowing a predetermined intervening time delay period (which may or may not be the same for the two conditions) for restabilization of the isolated alternator, should it be capable of restabilization, at the correct operating frequency.

It will become evident from a study of Figure 2 that the protective apparatus responds in substantially the same way to an underfrequency condition unaccompanied by a subnormal share of real power delivery by alternator A1, as it does to an underfrequency condition accompanied by the attendant subnormal share of real power delivery by that alternator which takes place, for example, when the governor of its prime mover causes the prime mover to operate at subnormal speed. Likewise it will be evident that the apparatus responds in substantially the same way to an overfrequency condition unaccompanied by an abnormal or excessive share of real power delivery by alternator A1, as it does to an overfrequency condition accompanied by an excessive share of real power delivery by alternator A1 caused, for example, by excessive drive torque applied by the prime mover P1 due to a fault in its governor. Contactor CB1 shorts out current transformer 10 in response to actuation of bus tie circuit breaker BB1, as does contactor CA1 in response to actuation of alternator circuit breaker AB1, as in Figure 1. With the current transformer 10 shorted out by either of these contactors, the remainder of the system may continue to operate as a system. Moreover, if the bus tie circuit breaker BB1 has been tripped the resulting short circuit across current transformer 10 during isolated operation of alternator A1 supplying its own load L1 continues to be under the protection of the overfrequency and underfrequency sensing apparatus. This is true inasmuch as, while $E_P$ becomes zero, yet $E_F$ assumes an appreciable value of one polarity or the other as frequency of the alternator departs above or below the assigned value. Thus, either an underfrequency or overfrequency condition during isolated operation will actuate the prime mover shutoff M1. Should an open circuit occur in the power division regulation loop E during parallel operation, a resulting excessive system frequency droop (droop will depend on total system real load) will split the system into its units for independent isolated operation thereof.

Figure 5:
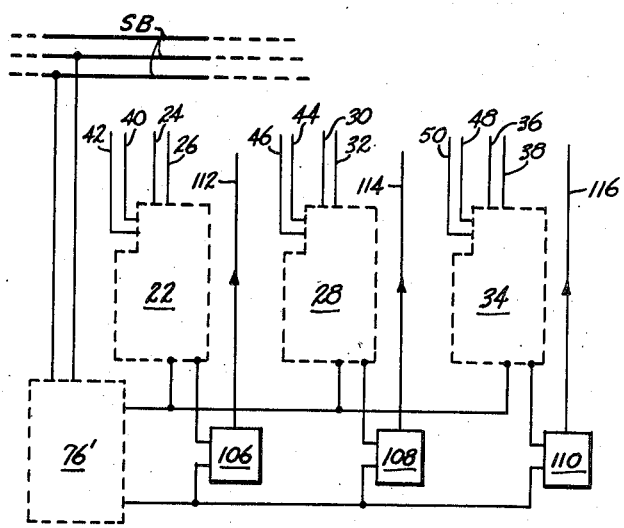
Figure 5 shows a modification of Figure 1.

In Figure 5 the arrangement of Figure 1 is employed with a single frequency discriminator 76', similar to 76, serving in the detection means for all of the alternators. Its energization is derived from the synchronizing bus SB. Such an arrangement offers simplicity but is not considered as reliable nor as versatile as the arrangements in which separate frequency discriminators are employed.

I claim as my invention:

1. In an alternating current system including a plurality of alternator units interconnected electrically in parallel and having prime movers with means controlling the same normally for predetermined load division among the alternators and for isochronous, frequency-regulated operation of said alternators, the combination for detecting malfunctioning of any alternator unit affecting system frequency and load division among the alternators, comprising frequency detecting means connected to said alternators and adapted to produce an output signal substantially proportional in magnitude to a deviation of frequency thereof from a predetermined value, said output signal being of one polarity for an upward frequency deviation and of the opposite polarity for a doward frequency deviation, differential real power sensing means for the respective alternators, including real current sensing means connected to the associated alternator and to the similar sensing means of the other alternators and adapted thereby to produce an output signal substantially proportional in magnitude to a difference between real power delivery by its associated alternator and average real power delivery by all of said interconnected alternators, said latter output signal being of one polarity for one sense of difference and of the opposite polarity for the opposite sense of difference, means interconnecting the respective outputs of said differential real power sensing means with the output of said frequency detecting means wih predetermined polarity relationship therebetween causing an output signal from the differential real power sensing means of any malfunctioning alternator unit to add the output signal from said frequency detecting means, while the simultaneously occurring output signals from the differential real power sensing means of the remaining alternator units subtract from the frequency detecting means output signal, and separate detector means responsively connected to each of said differential real power sensing means and selectively responsive to the summation of its output signal added to said frequency detecting means output signal.

2. In an alternating current system including a plurality of alternator units interconnected electrically in parallel and having prime movers with means controlling the same normally for predetermined load division among the alternators and for isochronous, frequency-regulated operation of said alternators, the combination for protecting the system against malfunctioning of any alternator unit affecting system frequency and load division among the alternators, comprising frequency detecting means connected to said alternators and adapted to produce an output signal substantially proportional in magnitude to a deviation of frequency thereof from a predetermined value, said output signal being of one polarity for an upward frequency deviation and of the opposite polarity for a downward frequency deviation, differential real power sensing means for the respective alternators, including real current sensing means connected to the associated alternator and to the similar sensing means of the other alternators and adapted thereby to produce an output signal substantially proportional in magnitude to a difference between real power delivery by its associated alternator and average real power delivery by all of said interconnected alternators, said latter output signal being of one polarity for one sense of difference and of the opposite polarity for the opposite sense of difference, means interconnecting the respective outputs of said differential real power sensing means with the output of said frequency detecting means with predetermined polarity relationship therebetween causing an output signal from the differential real power sensing means of any malfunctioning alternator unit to add to the output signal from said frequency detecting means, while the simultaneously occurring output signals from the differential real power sensing means of the remaining alternator units subtract from the frequency detecting means output signal, separate circuit breaker means operable to disconnect each of said alternators from the remaining alternators and to disconnect the real current sensing means of said alternator effectively from the related frequency detecting means and from the real current sensing means of said remaining alternators, and separate detector means responsively connected to each of said differential real power sensing means, and operatively connected to the associated circuit breaker means, said detector means being selectively responsive to the summation of the output signal of the associated differential real power sensing means added to that of said frequency detecting means, to operate the associated circuit breaker means.

3. The combination defined in claim 2, wherein the frequency detecting means comprise a plurality of similar but separate frequency detecting means connected to the respective alternators and having individual outputs interconnected with the outputs of the respectively associated differential real power sensing means.

4. The combination defined in claim 3, a separate load for each alternator, the circuit breaker means of each such alternator being adapted to disconnect the alternator and its load from the remaining alternators, the detector means of each alternator being responsive also to an output signal from the frequency detector means alone, and separate means operable to remove power from the respective prime movers, said latter means being connected to the detector means of the respectively associated alternators and adapted for operation thereby following operation of the associated circuit breaker means.

5. In an alternating current system including a plurality of alternator units interconnected electrically in parallel and having prime movers with means controlling the same normally for predetermined load division among the alternators and for isochronous, frequency-regulated operation of said alternators, the combination for detecting malfunctioning of any alternator unit affecting system frequency and load division among the alternators, comprising frequency detecting means connected to said alternators and adapted to produce an output signal substantially proportional in magnitude to a deviation of frequency thereof from a predetermined value, said output signal being of one polarity for an upward frequency deviation and of the opposite polarity for a downward frequency deviation, differential real power sensing means for the respective alternators, including real current sensing means connected to the associated alternator and to the similar sensing means of the other alternators and adapted thereby to produce an output signal substantially proportional in magnitude to a difference between real power delivery by its associated alternator and average real power delivery by all of said interconnected alternators, said latter output signal being of one polarity for one sense of difference and of the opposite polarity for the opposite sense of difference, means interconnecting the respective outputs of said differential real power sensing means with the output of said frequency detecting means with predetermined polarity relationship therebetween causing an output signal from the differential real power sensing means of any malfunctioning alternator unit to add to the output signal from said frequency detecting means to produce a resultant signal of one polarity for over-frequency and relative overloading of the alternator and of the opposite polarity for under-frequency and relative underloading of the alternator, while the simultaneously occurring output signals from the differential real power sensing means of the remaining alternator units subtract from the frequency detecting means output signal, and separate detector means responsively connected to each of said differential real power sensing means and selectively responsive to the resultant of its output signal added to said frequency detecting means output signal, said detector means including two separate portions each sensitive to resultant signals of a different polarity.

6. The combination defined in claim 5, a separate load connected to each of the alternators, a separate alternator circuit breaker interposed between each alternator and its load and operable to disconnect the alternator from its load, tie bus means interconnecting the alternator loads, a separate bus tie circuit breaker interposed between each alternator load and said tie bus means and operable to disconnect each alternator and its load from the other alternators, means operatively connecting both portions of the respective detector means to the bus tie circuit breaker means of the respectively associated alternators to operate the bus tie circuit breaker of any such malfunctioning alternator unit, time delay means associated with each alternator, controlled by operation of the associated bus tie circuit breaker means and operatively connecting the associated detector means portion which is sensitive to the underfrequency condition to the associated alternator circuit breaker, thereby to effect operation of the alternator circuit breaker of any alternator unit which operates in the underfrequency condition for longer than a predetermined time delay period following operation of the associated bus tie circuit breaker, and means controlled by operation of the respective bus tie circuit breakers effectively to disconnect the associated real current sensing means from the related frequency detecting means, and from the other real current sensing means.

7. The combination defined in claim 6, wherein the prime movers have individual shutoff means operable to remove drive power therefrom, and means controlled by operation of the time delay means of the respective alternators to operate the associated shutoff means thereby.

No references cited.

U. S. DEPARTMENT OF COMMERCE
PATENT OFFICE

CERTIFICATE OF CORRECTION

Patent No. 2,829,278                          April 1, 1958

Morris Flugstad

It is hereby certified that error appears in the printed specification of the above numbered patent requiring correction and that the said Letters Patent should read as corrected below.

Column 9, line 23, after "add" insert --to--.

Signed and sealed this 20th day of May 1958.

(SEAL)
Attest:
KARL H. AXLINE
Attesting Officer

ROBERT C. WATSON
Commissioner of Patents